United States Patent [19]

Sanderson et al.

[11] 4,077,926

[45] Mar. 7, 1978

[54] PRESSURE SENSITIVE ADHESIVE CONTAINING POLYMERIZED ALKOXYALKYL ESTER OF UNSATURATED CARBOXYLIC ACID

[75] Inventors: Frank Thomas Sanderson, Huntingdon Valley; Alexander Kowalski, Collegeville, both of Pa.; Roger H. Kottke, Redwood Falls, Minn.

[73] Assignee: Rohm and Haas Company, Philadelphia, Pa.

[21] Appl. No.: 463,483

[22] Filed: Apr. 24, 1974

Related U.S. Application Data

[63] Continuation-in-part of Ser. No. 355,128, Apr. 27, 1973, abandoned, which is a continuation of Ser. No. 89,028, Nov. 12, 1970, abandoned.

[51] Int. Cl.$^2$ .................. C08F 220/28; C08F 222/10; C09J 7/02
[52] U.S. Cl. ............................ 260/29.6 TA; 260/844; 260/851; 428/355; 428/463; 526/312; 526/317
[58] Field of Search ............... 260/844, 851, 29.6 TA, 260/78.5 R, 80.73, 80.75; 428/355; 526/312, 317

[56] References Cited

U.S. PATENT DOCUMENTS

| | | | |
|---|---|---|---|
| 2,768,080 | 10/1956 | Hellman et al. | 95/7 |
| 2,870,129 | 1/1959 | Merriam | 260/86.1 |
| 2,976,203 | 3/1961 | Young et al. | 154/140 |
| 2,976,204 | 3/1961 | Young et al. | 154/140 |
| 3,036,976 | 5/1962 | Sanderson | 260/17 |
| 3,299,010 | 1/1967 | Samour | 260/78 |
| 3,312,654 | 4/1967 | Pratt et al. | 260/33.4 |
| 3,453,345 | 7/1969 | Mabrey et al. | 260/834 |
| 3,459,716 | 8/1969 | Schaefer et al. | 260/78.5 |
| 3,575,911 | 4/1971 | Peterson | 260/29.6 |
| 3,780,003 | 12/1973 | Seymour et al. | 260/86.1 E |

FOREIGN PATENT DOCUMENTS

| | | | |
|---|---|---|---|
| 1,174,914 | 12/1969 | United Kingdom | 260/80.75 |

*Primary Examiner*—Stanford M. Levin
*Attorney, Agent, or Firm*—George W. F. Simmons

[57] ABSTRACT

The pressure sensitive adhesive of this invention has improved shear resistance while still having good tackiness and stability in a humid atmosphere, it is prepared by solution polymerization, or by other methods, and has carboxylic acid groups therein, an alkoxyalkyl ester of an unsaturated carboxylic acid, an hydroxyalkyl ester of an unsaturated carboxylic acid having at least one hydroxyl functionality and, in many cases, an alkyl acrylate or an alkyl methacrylate. A crosslinker may be used, and the adhesive cured by heat, without destroying the proper relationship of tack and shear resistance.

11 Claims, No Drawings

PRESSURE SENSITIVE ADHESIVE CONTAINING POLYMERIZED ALKOXYALKYL ESTER OF UNSATURATED CARBOXYLIC ACID

This is a continuation-in-part of U.S. Ser. No. 355,128, filed Apr. 27, 1973, which is a continuation of U.S. Ser. No. 89,028, filed Nov. 12, 1970, both abandoned.

This invention is concerned with improvements in pressure sensitive adhesives prepared from addition polymers, particularly from acrylic monomers by solution polymerization or equivalent methods, and articles made therewith.

Pressure sensitive adhesives have in the past been prepared from aqueous dispersions or organic solvent solutions of polymers, including those which have free carboxylic acid groups or monovalent salts thereof. Examples of the prior art are the Young and Toy U.S. Pat. Nos. 2,976,203 and 2,976,204. It is also known to chemically crosslink polymers in adhesives, the polymers therein having reactive groups such as carboxyl groups, which can be chemically reacted with crosslinking compounds, such as epoxies or bonded by other mechanisms. For example, it has heretofore been suggested that calcium oxide or zinc hydroxide added to a copolymer of ethylhexyl acrylate, ethyl acrylate, and the half-amide of an alkyl amine and maleic anhydrides provides crosslinking. The quantity of half-amide in the polymer ranged from 5% to 70%.

One of the problems in obtaining useful pressure sensitive adhesives is the relationship of tack to shear resistance. Often if an adhesive is modified to increase tackiness, its resistance to shearing is lowered, and commonly an increase in shear resistance is accompanied by a reduction in tackiness. According to one embodiment of the present invention, shear resistance is improved by crosslinking, surprisingly, while retaining excellent tack.

Pressure sensitive adhesives from acrylic monomers have almost universally contained an ester of acrylic acid as the tackifying resin. In fact, U.S. Pat. No. 3,299,010 states:

"Pressure sensitive adhesive polymers derived from methacrylate monomers or containing appreciable amounts of methacrylates are unknown."

It has been found, according to the present invention, that pressure sensitive adhesives having good tack as well as shear resistance are provided by polymers largely of alkoxyalkyl esters of $\alpha,\beta$-unsaturated carboxylic acids, and that large proportions of "soft" alkyl methacrylates are useful in such adhesives, although the latter are not necessary. In accordance with the invention, the adhesive contains a tacky polymer, in parts by weight, of about 5% to 99.5% of an alkoxyalkyl ester of an $\alpha,\beta$-unsaturated acid, about 0.25% to 20%, preferably 0.25% to 15% of an $\alpha,\beta$-unsaturated acid, about 0.5% to 20%, preferably 0.5% to 10% of an hydroxyalkyl ester of an $\alpha,\beta$-unsaturated carboxylic acid having at least one hydroxyl functionality, and as additional tackifying or "soft" monomers, 0% to 94.5% of an alkyl acrylate having an average of from 2 to 12 carbon atoms in the alkyl group or an alkyl methacrylate having from 5 to 20 carbon atoms and an average of from 5 to 16, preferably from 6 to 14 carbon atoms in the alkyl group. As is well known, the Tg of homopolymers of such esters of isomeric alcohols varies with the extent of chain branching, and this must be taken into consideration. The polymer has a Tg of below about 0° C. and preferably below about −15° C. The total of the monomers is based on weight and is 100%.

In a preferred embodiment, the alkoxyalkyl ester and the alkyl methacrylate make up at least 40% of the total monomers and preferably up to 65% of the total monomers, 0.5% to 10% of the hydroxyalkyl ester with hydroxyl functionality, and the unsaturated acid monomer is present in an amount between 0.25% and 15%, and less than about half of the monomer mixture is an alkyl acrylate having from 2 to 12 carbon atoms in the alkyl group. In this embodiment, at least 10% of the soft methacrylic ester is used.

In another preferred embodiment, an organic compound having two or more functional groups capable of reacting with the carboxylic and hydroxyl groups in the polymer is included to crosslink the said carboxylic groups. Among the polyfunctional compounds are phenol-formaldehyde, aminoplasts such as melamine-formaldehyde and alkylated melamine-formaldehyde, urea-formaldehyde, zinc chloride modified melamine-formaldehyde, compounds with at least two epoxy groups, isocyanate groups, amine groups, or hydroxyl groups, or the polymer may be treated with or may have included therein peroxides which cause a crosslinking reaction to take place. The amount of crosslinker is from 0.1% to 10%, preferably 1% to 5%. Such crosslinkers are well known in the pressure sensitive adhesive art.

In addition to the monomers described above, it is permissible to include small amounts of alkyl acrylates in which the alkyl group is methyl or has from 13 to 20 carbon atoms or an alkyl methacrylate in which the alkyl group has from 1 to 4 carbon atoms or from 15 to 20 carbon atoms. These monomers must be used, if at all, in such small amounts as to not detract from the tacky properties of the polymer. These particular monomers tend to form hard polymers when used in large amounts.

By "alkoxyalkyl ester of an $\alpha,\beta$-unsaturated carboxylic acid" is generally meant one having the following structure:

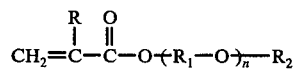

wherein R is H or methyl, $R_1$ is a straight chain or branched chain alkylene radical containing from 1 to 4 carbon atoms, preferably 2 carbon atoms, $R_2$ is an alkyl radical containing from 1 to 4 carbon atoms, preferably 1 to 2 carbon atoms, and $n$ is 1 to 4, preferably 1. Representative monomers are methoxyethyl methacrylate (MOEMA), ethoxyethyl methacrylate (EOEMA), methoxyethyl acrylate (MOEA), ethoxyethyl acrylate (EOEA), butoxyethyl methacrylate (BOEMA), methoxybutyl acrylate (MOBMA), methoxyethoxyethyl acrylate (MOEOEA), and so forth. The acid moiety, while preferably acrylic or methacrylic, can be from others, such as those $\alpha,\beta$-unsaturated acids described below.

An important monomer of the copolymer composition is the hydroxyalkyl ester of an $\alpha,\beta$-unsaturated carboxylic acid having at least one hydroxyl group. This hydroxyl containing monomer can be crosslinked by the crosslinking agent to a higher degree than carboxyl containing monomers, under normal curing conditions, and this improved crosslinking is reflected in the great stability in humid atmospheres that the hydroxyl containing monomer provides to the overall composition. This monomer can be either a partial or full hydroxyalkyl ester of a monobasic or polybasic α,β-unsaturated carboxylic acid with less than 36 atoms, preferably having less than about 20 atoms. Examples include: acrylic acid, methacrylic acid, sorbic acid, crotonic acid, isocrotonic acid, maleic acid, methylene glutaric acid, fumaric acid, itaconic acid, aconitic acid, citraconic acid, mesaconic acid, monochloromaleic acid, dichloromaleic acid, hydromuconic acid, glutaconic acid, and so forth. The alcohols that may be used include: 2-hydroxyethanol, 3-hydroxypropanol, 4-hydroxybutanol, 5-hydroxyamyl alcohol, 6-hydroxyhexanol, 7-hydroxyeptanol, 8-hydroxyoctanol, 9-hydroxynonanol, 10-hydroxydecanol, 3-chloro-4-hydroxybutanol, 4,4-dichloro-6-hydroxyhexanol, 3-nitro-8-hydroxyoctanol, 3-bromo-4-hydroxybutanol, 4-hydroxy-6-chloro-8-hydroxyoctanol, and the like.

In addition to the alkoxyalkyl ester monomer and hydroxyalkyl ester monomer, the other essential monomer is any copolymerizable ethylenically unsaturated monocarboxylic or polycarboxylic acid, examples being sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. The acid monomer may contain more than one carboxylic acid group as has been suggested above by specific example.

The optional added "soft" or tackifying monomer may be represented by the formula:

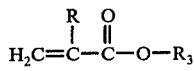

wherein R is H or methyl, and $R_3$ is the straight chain or branched chain radical of a primary or secondary alkanol or alkylthiaalkanol, and having an average of up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, cyclohexyl, n-hexyl, isobutyl, ethylthiaethyl, methylthiaethyl, ethylthiapropyl, n-octyl, 6-methylnonyl, decyl, mixed dodecyl-pentadecyl, dodecyl, and the like, and mixtures thereof. When R is methyl and $R_3$ is alkyl, $R_3$ must have from about 6 to about 14 carbon atoms, and when R is H and $R_3$ is alkyl, $R_3$ must have from about 2 to about 12 carbon atoms, in order to qualify as a soft or tackifying monomer.

As is apparent from the disclosure elsewhere herein, an important property of the polymer is the Tg (glass transition temperature) thereof, and consequently the selection of monomers and proportions thereof depends upon their influence on the Tg. The Tg of the polymer must be below 0° C. (i.e., it must give a tacky coating) and is preferably below −15° C. "Tg" is a conventional criterion of polymer hardness and is described by Flory, "Principles of Polymer Chemistry" pp. 56 and 57, (1953), Cornell University Press and the February, 1962 issue of "Official Digest of the Federation of Societies for Paint Technology." While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Homopolymer of | Tg |
|---|---|
| n-octyl acrylate | −80° C. |
| 2-ethylhexyl acrylate | −70° C. |
| n-decyl methacrylate | −60° C. |
| ethoxyethyl acrylate | −56° C. |
| methoxyethyl acrylate | −49° C. |
| octyl methacrylate | −20° C. |
| ethoxyethyl methacrylate | −15° C. |
| methoxyethyl methacrylate | −10.5° C. |
| n-tetradecyl methacrylate | −9° C. |
| methyl acrylate | 9° C. |
| n-tetradecyl acrylate | 20° C. |
| methyl methacrylate | 105° C. |
| acrylic acid | 106° C. |

Such monomers are blended to give the desired Tg of the copolymer. Most of the esters of acrylic acid having a low Tg are well known in the pressure sensitive adhesive art as tackifying monomers. The similar methacrylic esters are not so well known.

The optional ethylenically unsaturated copolymerizable "hard" monomers having a Tg of above 0° C. are useful in combinations with the above mentioned monomers provided they do not adversely affect the desired properties of the adhesive (e.g., unduly raise the overall Tg) and do not seriously interfere with the tack-shear relationship. These may be represented by the formula:

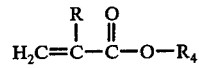

wherein R is as above. $R_4$ is preferably alkyl and is methyl or alkyl having from about 13 to about 20 carbon atoms when R is H, and is alkyl of from 1 to about 4 carbon atoms or alkyl of from about 15 to about 20 carbon atoms for linear alkyl groups when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, acrylamide, acrylonitrile, vinyl acetate, tetradecyl acrylate, pentadecyl acrylate, methyl methacrylate, ethyl methacrylate, t-butyl acrylate, vinyl acetate, butyl methacrylate, styrene, pentadecyl methacrylate, vinyl toluene, methacrylamide, N-methylolacrylamide and the like, present, if at all, in amounts of less than about 50%, preferably less than 25%, by weight of the total amount of monomers. Thus, polymers stated as consisting essentially of the unsaturated acid monomer and the alkoxyalkyl ester include such additional monomers as do not change the basic characteristics of the adhesive material of the invention. While classified as "hard" monomers on the basis of the Tg of homopolymers of such monomers, they may form copolymers softer than would be theorized from the Tg's of each monomer.

The polymers are prepared in aqueous dispersion form or in organic solutions, e.g., in xylene, methyl "Cellosolve", and the like, by well known conventional means such as free radical initiation with benzoyl peroxide or the like. Solution or aqueous dispersion polymers useful in the invention preferably have a molecular weight of between about 10,000 and 1,000,000.

Conventional additives for pressure sensitive adhesives are also useful, examples including fillers or pigments, tackifier resins such as wood rosin, polyesters and the like, plasticizers such as the alkyl esters of adipic or phthalic acids, antioxidants, foam suppressors, and so forth. Many types of fillers or pigments may be employed. One of the best is rutile titanium dioxide. Others such as anastase titanium dioxide, lithopone, magnesium silicate, clay, wollastonite, zinc oxide, calcium carbonate, clays including kaolin and bentonite, colloidal silica, walnut shell, and so on, are useful. To some extent fibrous fillers such as cellulosic fibers or nylon staple may be employed. These additives are incorporated in the aqueous dispersion, nonaqueous dispersion or solution prior to coating the substrate therewith.

Any backing or substrate is useful, including rigid, flexible, non-extensible or stretchable materials including textile fabric, plastic film, nonwoven fiber sheets including water-laid and air-laid products, metal sheets or foil, rubber or synthetic rubber, decorative sheets, plywood edging for plywood sheets, decals, and so forth. If in a roll, the back of the tape is usually coated with a release, backsize, or adhesive coating. Two sided adhesive articles are also useful. If not coiled into a roll, strippable paper or other protective means is provided. Commonly the face of the backing to which the pressure sensitive adhesive is applied is sized to improve the adhesion of the backing and the adhesive.

The adhesive of the present invention has been found to provide exceptionally good bonds with numerous substrates, including wood, paper, Formica brand decorative sheets, other plastic materials such as methyl methacrylate polymer polyvinyl chloride, saran, polyethylene glycol terephthalate, nylon, phenolformaldehyde resins, urea-formaldehyde resins, and other thermoset materials such as melamine-formaldehyde resins; rayon, cotton, silk, wool, fibers of the polymeric materials mentioned above, leather, linoleum, asphalt tile, vinyl tile, ceramic tile, various silicates such as glass, mineral wool, asbestos, concrete, asbestos cement, plaster, metals such as aluminum, steel, iron, copper, zinc, chromium, nickel, as well as painted or enamelled surfaces, such as painted automobile bodies, woodwork, walls, ceilings, or floors.

Pre-cemented articles such as tapes, wallpapers, or tiles for decorating walls, floors, or ceilings may be produced in which the member to be ultimately applied to a surface to be decorated, such as a tape, wallpaper, or tile is provided on its back surface with a layer of the composition of the present invention and a protective backing is applied over the adhesive layer and is adapted to be stripped therefrom at the time the member is to be applied to the surface it is ultimately intended for. The protective layer may be a thin film of polyethylene or other material which can be stripped more or less readily from the adhesive layer. Besides tape, wallpaper, and tile, this technique may be used in connection with plastic films, wood veneer layers, or thin sheets of resin or plastic material such as sheets of Formica plastic or vinyl resin; and such films or sheets may be of any size adapted to be cut to ultimate size in the finishing of tables, counters, desks, or other furniture.

The adhesive composition may be colored or substantially colorless. Besides depending on the color of fillers, suitable colored pigments may be added in place of, or in addition to, the fillers. Also, if desired, direct dyes may be introduced to provide a desired color.

The permanently pressure sensitive adhesive is applied to the substrate or backing in various ways. One method is to apply a solution of the polymer to the base, followed by drying with heat. Any conventional coating method is useful.

In the following examples, which are illustrative of the invention, the parts and percentages are by weight unless otherwise noted.

While the polymer of the invention is preferably an organic solvent solution or less desirably an aqueous dispersion prepared in those media, it may also be used and/or prepared as a nonaqueous dispersion, a bulk polymerizable, an organic solvent solution of the polymer emulsified in water, and the like.

EXAMPLE

An acrylic polymer solution is prepared at 43% solids in the 80 ethyl acetate/20 toluene solvent mix using azobisiobutyronitrile initator and a monomer mixture comprised of 24.5 parts by weight of a mixture of long chain alkyl methacrylates in solids, the alkyl radicals contain 12–15 carbons, identified as dodecyl-pentadecyl methacrylates, 30 parts of methoxyethyl acrylate, 40 parts butylacrylate, 5 parts hydroxyethyl methacrylate and 0.5 parts acrylic acid. After cooling, 46 grams of this polymer solution are charged to a glass jar and treated with 4 grams n-butanol and 0.7 grams of a solution containing 60% butylated melamine-formaldehyde resin dissolved in a 50 xylol/50 butanol solvent system. These ingredients are thoroughly mixed and used in the preparation of pressure sensitive tapes by the procedures illustrated in Example 1. These tapes are found to have the following properties:

| 180° Peel Strength | 33 oz/in | (P.S.T.C. Method No. 1) |
|---|---|---|
| Shear Resistance | >90 hrs. | (P.S.T.C. Method No. 7) |
| Tack (Rolling Ball) | 1.3 inches | (P.S.T.C. Method No. 6) |
| Tack (Touch Rating) | Excellent | (Qualitative) |

The following give general descriptions of Pressure Sensitive Tape Council tests.

P. S. T. C. METHOD 1 — 180° PEEL STRENGTH

This test basically involves determining resistance of pressure sensitive tape/stainless steel laminates to being delaminated at a 180° angle and at a rate of 12 inches per minute. The test laminates are consistently prepared by laying the adhesive tape onto the cleaned stainless steel plates and using only the pressure from two passes of a 4.5 pound roller to complete lamination.

P. S. T. C. METHOD 7 — SHEAR RESISTANCE

Shear resistance is measured as the time to failure for ½ × 1 inch tape/stainless steel laminates loaded with a 1000 gram weight and hung in an essentially vertical position. The adhesive tape/stainless steel laminates were prepared by the same method as the peel strength test laminates.

P. S. T. C. METHOD 6 — ROLLING BALL TACK

This tack rating measures the distance a 5.5 gram, 7/16 inch diameter steel ball bearing will travel on adhesive tape before being stopped by the adhesive. The ball is rolled onto the adhesive tape from a 21.5° inclined plane from a point 2.0 inches above the point of contact between tape and inclined plane.

QUALITATIVE TACK

Qualitative "touch tack" ratings are subjective tack ratings made by a 4–6 member tack panel.

We claim:

1. A water-insoluble pressure sensitive adhesive in the form of a dry film, an organic solvent solution, an aqueous dispersion, or a nonaqueous dispersion, containing a polymer, a dry film of which is tacky, the polymer containing, in parts by weight, of about 5% to 99.5% of an alkoxyalkyl ester of an $\alpha,\beta$-unsaturated acid, the alkoxyalkyl group having the structure $-(-R_1-O-)_n-R_2$ wherein $R_1$ is alkylene having 1 to 4 carbon atoms and $R_2$ is alkyl having 1 to 4 carbon atoms, $n$ being from 1 to 4, about 0.25% to 20% of an $\alpha,\beta$-unsaturated acid, selected from the group consisting of itaconic acid and $\alpha,\beta$-unsaturated monocarboxylic acids, about 0.5% to 20% of an hydroxyalkyl ester of an $\alpha,\beta$-unsaturated carboxylic acid having at least one hydroxyl functionality, and 0% to 94.5% of at least one of an alkyl acrylate having from 2 to 12 carbon atoms in the alkyl group and an alkyl methacrylate having an average of from 6 to 14 carbon atoms in the alkyl group, and optionally one or more of an ester of acrylic acid having 1 or 13 to 20 carbon atoms in the alkyl group and an ester of methacrylic acid having 1 to 4 or 15 to 20 carbon atoms in the alkyl group, said polymer having a Tg of below about $-15°$ C., the total parts being 100.

2. The composition of claim 1 in which the polymer consists essentially of the unsaturated acid, the alkoxyalkyl ester, said alkyl acrylate, and said alkyl methacrylate, $n$ is 1, the combined amounts of the alkoxyalkyl ester and alkyl methacrylate being at least 40% of the total monomers, the carboxylic acid present in an amount of from 0.25% to 15% of the total monomers, and the hydroxyalkyl carboxylic acid ester is present in an amount of from 0.5% to 10%.

3. The composition of claim 1 in which a polyfunctional organic compound is included which is capable of crosslinking free carboxyl and hydroxyl groups in said polymer.

4. An article having a dried pressure sensitive adhesive layer of the composition of claim 1.

5. An article having a dried pressure sensitive adhesive layer of the composition of claim 2.

6. An article having a dried pressure sensitive adhesive layer of the composition of claim 3.

7. The composition of claim 3 in which the polyfunctional compounds are phenol-formaldehyde, an aminoplast, or a compound having at least two epoxy, isocyanate, amine, or hydroxyl groups, or a peroxide.

8. A water-insoluble pressure sensitive adhesive in the form of a dry film, an organic solvent solution, an aqueous dispersion, or a nonaqueous dispersion, containing a polymer, a dry film of which is tacky, consisting of, in parts by weight, of about 5% to 99.5% of an alkoxyalkyl ester of an $\alpha,\beta$-unsaturated acid, the alkoxyalkyl group having the structure $-(-R_1-O-)_n-R_2$ wherein $R_1$ is alkylene having 1 to 4 carbon atoms and $R_2$ is alkyl having 1 to 4 carbon atoms, $n$ being from 1 to 4, about 0.25% to 20% of an $\alpha,\beta$-unsaturated acid, selected from the group consisting of itaconic acid and $\alpha,\beta$-unsaturated monocarboxylic acids, about 0.5% to 20% of an hydroxyalkyl ester of an $\alpha,\beta$-unsaturated carboxylic acid having at least one hydroxyl functionality, and 0% to 94.5% of an alkyl acrylate having from 2 to 12 carbon atoms in the alkyl group or an alkyl methacrylate having an average of from 5 to 16 carbon atoms in the alkyl group, optionally with 0% to 50% of other acrylates or methacrylates having alkyl groups with 1 to 20 carbon atoms, styrene, vinyl toluene, acrylamide, methacrylamide or n-methylolacrylamide, said polymer having a Tg of below about $-15°$ C., the total parts being 100.

9. A water-insoluble pressure sensitive adhesive in the form of a dry film, an organic solvent solution, an aqueous dispersion, or a nonaqueous dispersion, containing a polymer, a dry film of which is tacky, the polymer containing, in parts by weight, of about 5% to 99.5% of an alkoxyalkyl ester of an $\alpha,\beta$-unsaturated acid, the alkoxyalkyl group having the structure $-(-R_1-O-)_n-R_2$ wherein $R_1$ is alkylene having 1 to 4 carbon atoms and $R_2$ is alkyl having 1 to 4 carbon atoms, $n$ being from 1 to 4, about 0.25% to 20% of an $\alpha,\beta$-unsaturated acid, selected from the group consisting of itaconic acid and $\alpha,\beta$-unsaturated monocarboxylic acids, about 0.5% to 20% of an hydroxyalkyl ester of an $\alpha,\beta$-unsaturated carboxylic acid having at least one hydroxyl functionality, and 0% to 94.5% of an alkyl acrylate having from 2 to 12 carbon atoms in the alkyl group or an alkyl methacrylate having an average of from 5 to 16 carbon atoms in the alkyl group, said polymer having a Tg of below about $-15°$ C., the total parts being 100.

10. A dry, tacky film of a water-insoluble pressure sensitive adhesive containing a polymer, consisting of, in parts by weight, of about 5% to 99.5% of an alkoxyalkyl ester of an $\alpha,\beta$-unsaturated acid, the alkoxyalkyl group having the structure $-(-R_1-O-)_n-R_2$ wherein $R_1$ is alkylene having 1 to 4 carbon atoms and $R_2$ is alkyl having 1 to 4 carbon atoms, $n$ being from 1 to 4, about 0.25% to 20% of an $\alpha,\beta$-unsaturated acid, selected from the group consisting of itaconic acid and $\alpha,\beta$-unsaturated monocarboxylic acids, about 0.5% to 20% of an hydroxyalkyl ester of an $\alpha,\beta$-unsaturated carboxylic acid having at least one hydroxyl functionality, and 0% to 94.5% of an alkyl acrylate having from 2 to 12 carbon atoms in the alkyl group or an alkyl methacrylate having an average of from 5 to 16 carbon atoms in the alkyl group, optionally with a minor proportion of other acrylates or methacrylates, styrene, vinyl toluene, acrylamide, methacrylamide, or n-methylolacrylamide, said polymer having a Tg of below about $-15°$ C., the total parts being 100.

11. The composition of claim 8 in which the optional other acrylates or methacrylates having alkyl groups with 1 to 20 carbon atoms, styrene, vinyl toluene, acrylamide, methacrylamide, or n-methylolacrylamide, are present in a proportion of 0% to 25%.

* * * * *